US012109773B2

(12) United States Patent
Chen et al.

(10) Patent No.: US 12,109,773 B2
(45) Date of Patent: Oct. 8, 2024

(54) METHOD AND APPARATUS FOR FORMING AN APEX

(71) Applicant: The Goodyear Tire & Rubber Company, Akron, OH (US)

(72) Inventors: Hongbing Chen, Broadview Heights, OH (US); Christopher David Dyrlund, Canton, OH (US); Adam Mark Baldan, Akron, OH (US)

(73) Assignee: THE GOODYEAR TIRE & RUBBER COMPANY, Akron, OH (US)

( * ) Notice: Subject to any disclaimer, the term of this patent is extended or adjusted under 35 U.S.C. 154(b) by 939 days.

(21) Appl. No.: 17/008,073

(22) Filed: Aug. 31, 2020

(65) Prior Publication Data

US 2020/0398512 A1    Dec. 24, 2020

Related U.S. Application Data

(63) Continuation-in-part of application No. 16/659,859, filed on Oct. 22, 2019, now abandoned.

(60) Provisional application No. 62/781,781, filed on Dec. 19, 2018.

(51) Int. Cl.
*B29D 30/30* (2006.01)
*B29D 30/62* (2006.01)
*B29C 48/49* (2019.01)

(52) U.S. Cl.
CPC ......... *B29D 30/3007* (2013.01); *B29D 30/62* (2013.01); *B29C 48/49* (2019.02)

(58) Field of Classification Search
CPC ......... B29C 48/04; B29C 48/49; B29D 30/62; B29D 30/3007; B60C 15/0607; B60C 2001/0058
See application file for complete search history.

(56) References Cited

U.S. PATENT DOCUMENTS

| | | | | |
|---|---|---|---|---|
| 5,203,938 A * | 4/1993 | Moody | ................. | B29D 30/48 156/212 |
| 5,725,814 A * | 3/1998 | Harris | ..................... | B29C 48/08 264/211.13 |
| 2005/0133135 A1* | 6/2005 | Corvasce | .............. | B60C 1/0025 152/555 |
| 2006/0096696 A1 | 5/2006 | Oku et al. | | |
| 2012/0160391 A1 | 6/2012 | Van Riper | | |

(Continued)

FOREIGN PATENT DOCUMENTS

CN    2558539 Y    7/2003
EP    3112143 B1    12/2018

OTHER PUBLICATIONS

China Search Report for Serial No. 201911319090.X dated Jun. 15, 2021.

(Continued)

*Primary Examiner* — S. Behrooz Ghorishi
*Assistant Examiner* — Alexander A Wang
(74) *Attorney, Agent, or Firm* — Katherine A. Smith

(57) ABSTRACT

A method for forming a composite apex, the method comprising the steps of: forming a coextruded strip of a first compound and a second compound, wherein the second compound is a compound different than the first compound, wherein the apex is formed from winding the coextruded strip while varying the ratio of the first compound to the second compound.

13 Claims, 11 Drawing Sheets

(56) References Cited

U.S. PATENT DOCUMENTS

| | | |
|---|---|---|
| 2012/0180936 A1 | 7/2012 | Schuler |
| 2012/0318440 A1* | 12/2012 | Vargo .................... B29D 30/62 |
| | | 156/422 |
| 2014/0161584 A1* | 6/2014 | Kohnen ................ B29D 30/48 |
| | | 248/346.03 |
| 2015/0090381 A1 | 4/2015 | Shimomura |
| 2017/0001399 A1 | 1/2017 | Dyrlund et al. |
| 2018/0093406 A1 | 4/2018 | De Bruijn et al. |

OTHER PUBLICATIONS

European Search Report for Serial No. EP19217311 dated May 14, 2020.

\* cited by examiner

METHOD AND APPARATUS FOR FORMING AN APEX

FIELD OF THE INVENTION

The invention relates in general to tire manufacturing, and more particularly to a method for forming an improved method for making an improved apex for a pneumatic tire.

BACKGROUND OF THE INVENTION

A conventional radial-ply automobile tire includes radial plies that are wrapped around two annular inextensible beads. The portions of the plies that extend beyond the beads are turned up around the beads, forming "turn-ups." An annular rubber filler bounded by the turned up ply and the bead is called an "apex." The choice of dimensions and material properties of the apex affects the performance of the tire, such as tire weight, sidewall stiffness, handling, ride comfort, flexural heat, material fatigue, and tire life. It is desired to form the apex such that is does not have a splice in order to improve tire uniformity and consistency. It is also desirable to form an apex that has a tip that does not curl. It is also desired to have an improved method and apparatus for making an improved apex that can be made of multiple compounds in desired ratios in order to improve the tire's performance attributes previously mentioned. It is further desired to have an improved method and apparatus for making an improved apex that has a continuously variable ratio of two different compounds, which avoids a discrete change from one compound to another.

Definitions

"Aspect Ratio" means the ratio of a tire's section height to its section width.

"Axial" and "axially" means the lines or directions that are parallel to the axis of rotation of the tire.

"Bead" or "Bead Core" means generally that part of the tire comprising an annular tensile member, the radially inner beads are associated with holding the tire to the rim being wrapped by ply cords and shaped, with or without other reinforcement elements such as flippers, chippers, apexes or fillers, toe guards and chafers.

"Belt Structure" or "Reinforcing Belts" means at least two annular layers or plies of parallel cords, woven or unwoven, underlying the tread, unanchored to the bead, and having both left and right cord angles in the range from 17° to 27° with respect to the equatorial plane of the tire.

"Bias Ply Tire" means that the reinforcing cords in the carcass ply extend diagonally across the tire from bead-to-bead at about 25-65° angle with respect to the equatorial plane of the tire, the ply cords running at opposite angles in alternate layers.

"Breakers" or "Tire Breakers" means the same as belt or belt structure or reinforcement belts.

"Carcass" means a laminate of tire ply material and other tire components cut to length suitable for splicing, or already spliced, into a cylindrical or toroidal shape. Additional components may be added to the carcass prior to its being vulcanized to create the molded tire.

"Circumferential" means lines or directions extending along the perimeter of the surface of the annular tread perpendicular to the axial direction; it can also refer to the direction of the sets of adjacent circular curves whose radii define the axial curvature of the tread as viewed in cross section.

"Cord" means one of the reinforcement strands, including fibers, which are used to reinforce the plies.

"Inner Liner" means the layer or layers of elastomer or other material that form the inside surface of a tubeless tire and that contain the inflating fluid within the tire.

"Inserts" means the reinforcement typically used to reinforce the sidewalls of runflat-type tires; it also refers to the elastomeric insert that underlies the tread.

"Ply" means a cord-reinforced layer of elastomer-coated, radially deployed or otherwise parallel cords.

"Radial" and "radially" mean directions radially toward or away from the axis of rotation of the tire.

"Radial Ply Structure" means the one or more carcass plies or which at least one ply has reinforcing cords oriented at an angle of between 65° and 90° with respect to the equatorial plane of the tire.

"Radial Ply Tire" means a belted or circumferentially-restricted pneumatic tire in which the ply cords which extend from bead to bead are laid at cord angles between 65° and 90° with respect to the equatorial plane of the tire.

"Sidewall" means a portion of a tire between the tread and the bead.

"Tangent delta", or "tan delta," is a ratio of the shear loss modulus, also known as G", to the shear storage modulus (G'). These properties, namely the G', G" and tan delta, characterize the viscoelastic response of a rubber test sample to a tensile deformation at a fixed frequency and temperature, measured at 100° C.

"Laminate structure" means an unvulcanized structure made of one or more layers of tire or elastomer components such as the innerliner, sidewalls, and optional ply layer.

BRIEF DESCRIPTION OF THE DRAWINGS

The invention will be described by way of example and with reference to the accompanying drawings in which:

FIG. 6 is a perspective cutaway view of a coextrusion nozzle of the present invention, while

DETAILED DESCRIPTION OF THE INVENTION

Figure 1A:
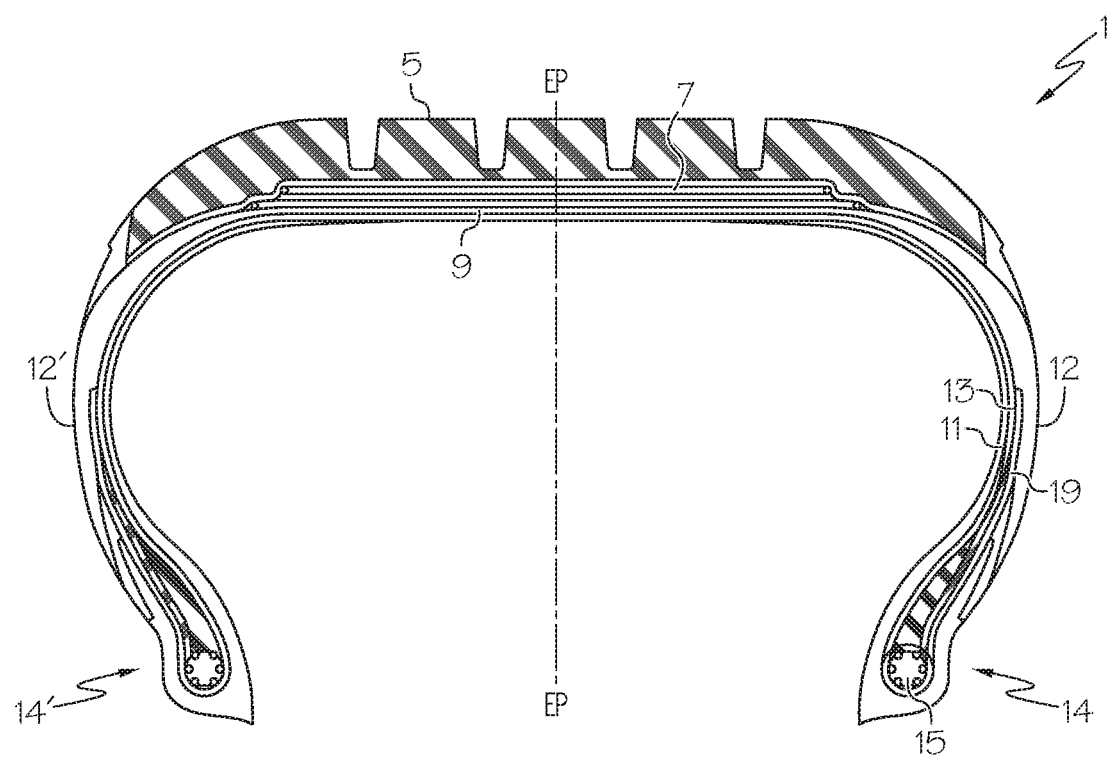
FIG. 1A shows a meridional cross-section of a radial ply pneumatic tire according to the present invention.
Figure 1B:
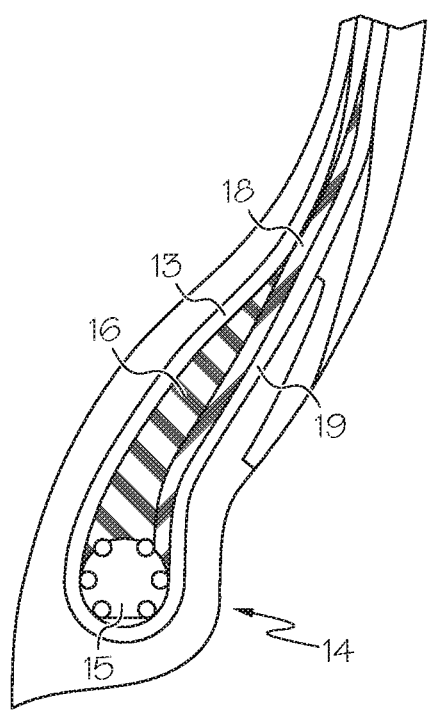
FIG. 1B shows a cross-section of the bead section of FIG. 1A.

FIG. 1A illustrates a cross-sectional view of a pneumatic tire 1 having a tread 5, a belt structure comprising one or more belts 7, and a carcass 9. The carcass 9 has an innerliner 11, at least one radial ply 13, two sidewalls 12, 12', and two opposed bead areas 14, 14' having an annular bead wire 15. FIG. 1B shows a cross-section of the bead areas 14 of FIG. 1A. The bead areas 14 have an axially-inner apex 16 formed of a first material and an axially-outer apex 18 formed of a second material. Thus, in this first example of an apex configuration, two different apexes are used having different stiffness properties in order to have the desired overall properties.

Figure 2A:
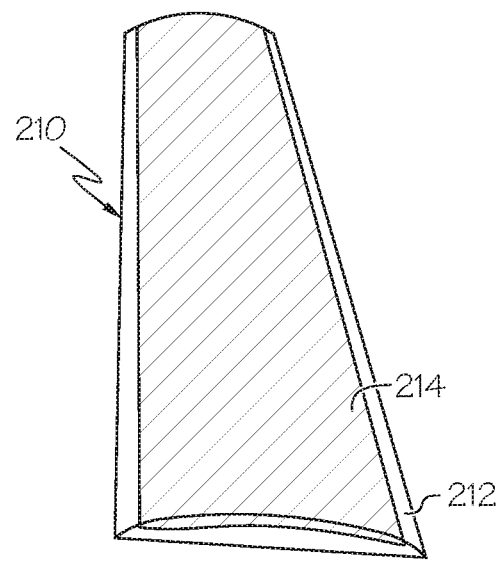
FIG. 2A is a perspective view of a coextruded strip of 90% of a first compound and 10% of a second compound of the present invention.
Figure 3:
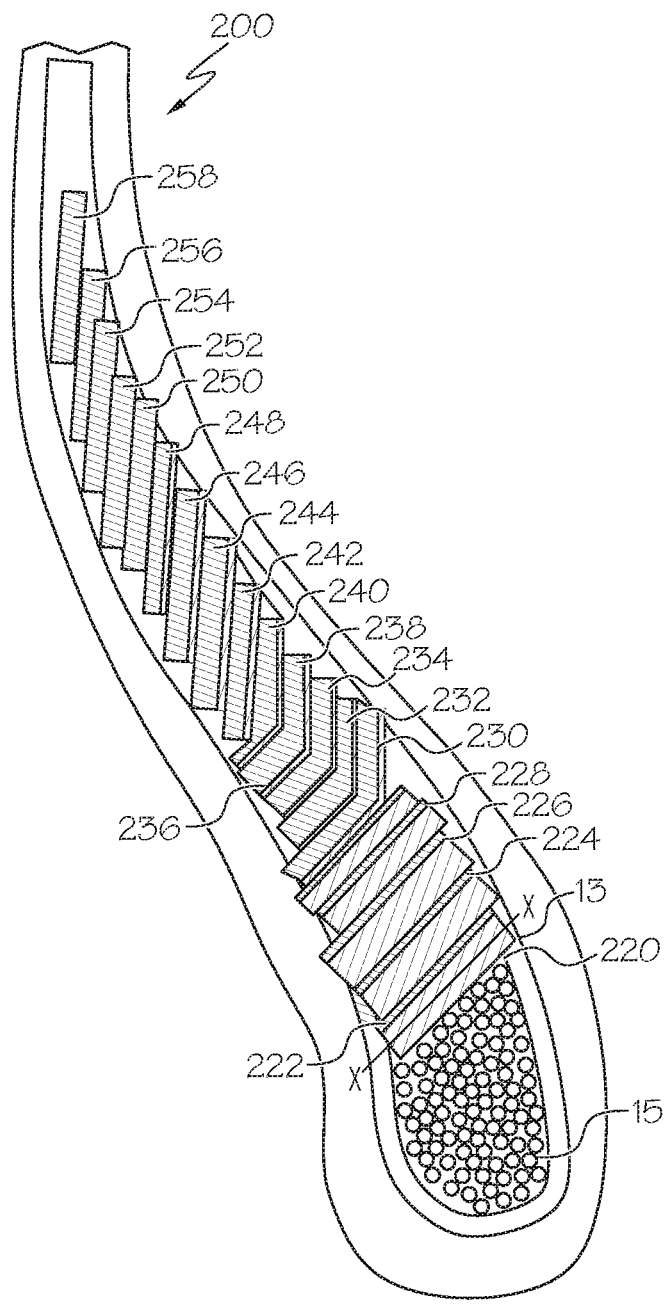
FIG. 3 is a cross-sectional view of a composite apex of the present invention.
Figure 4:
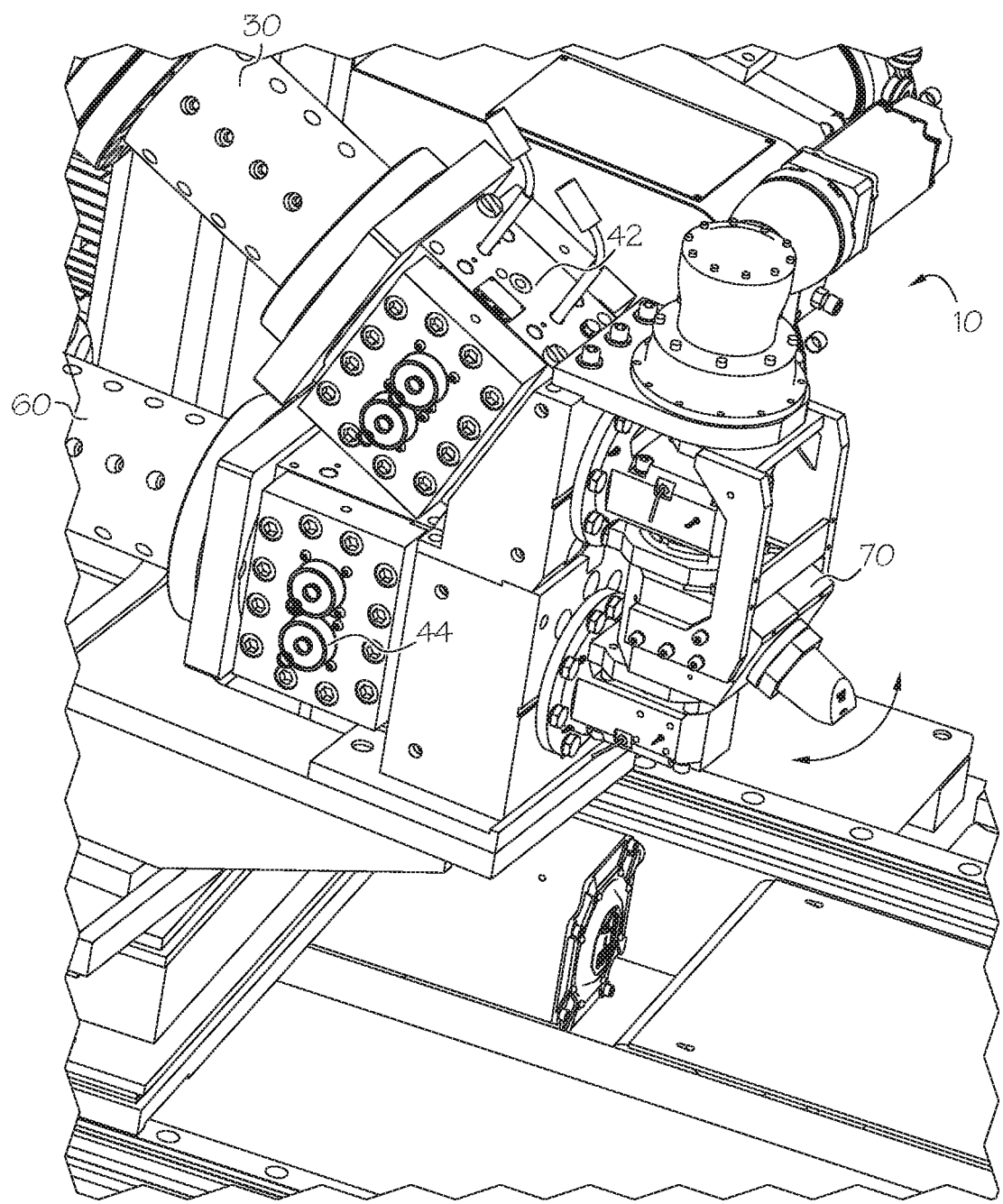
FIG. 4 is a perspective view of a dual compound apparatus for forming a coextruded strip onto a tire building drum.
Figure 5:
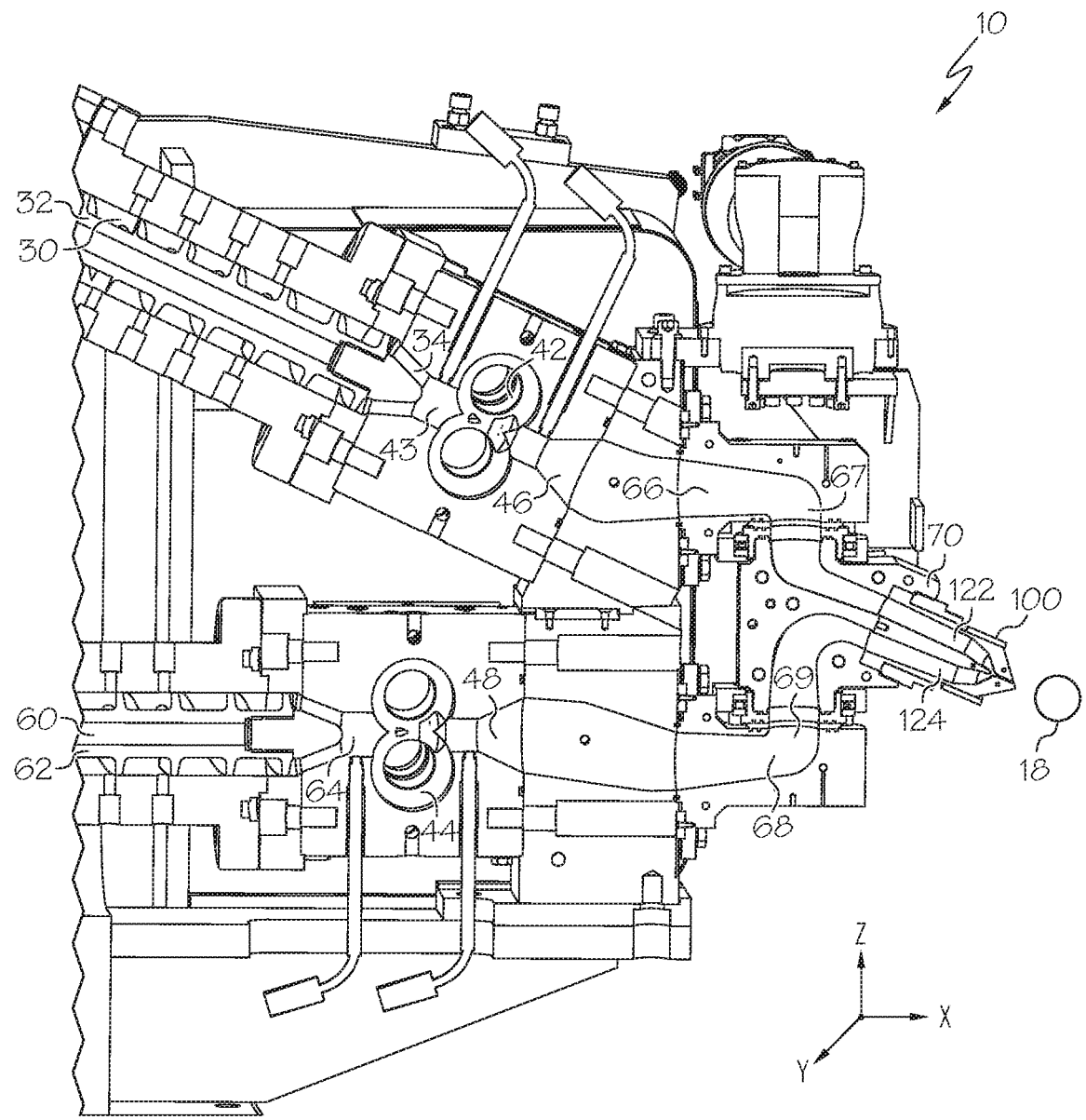
FIG. 5 is a cross-sectional view of the dual compound apparatus of FIG. 4.
Figure 6:
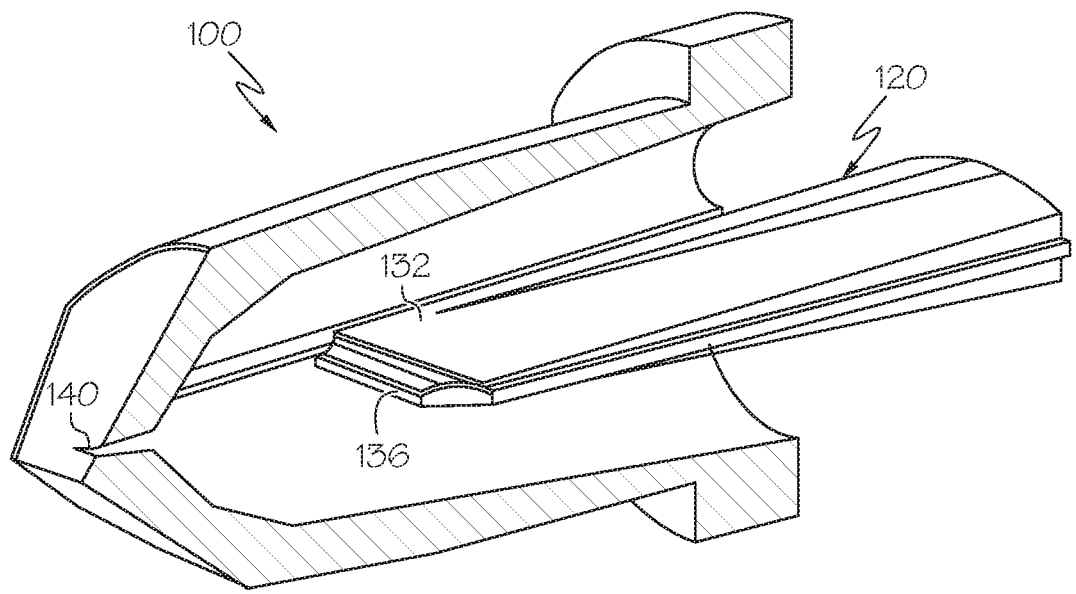
Figure 7:
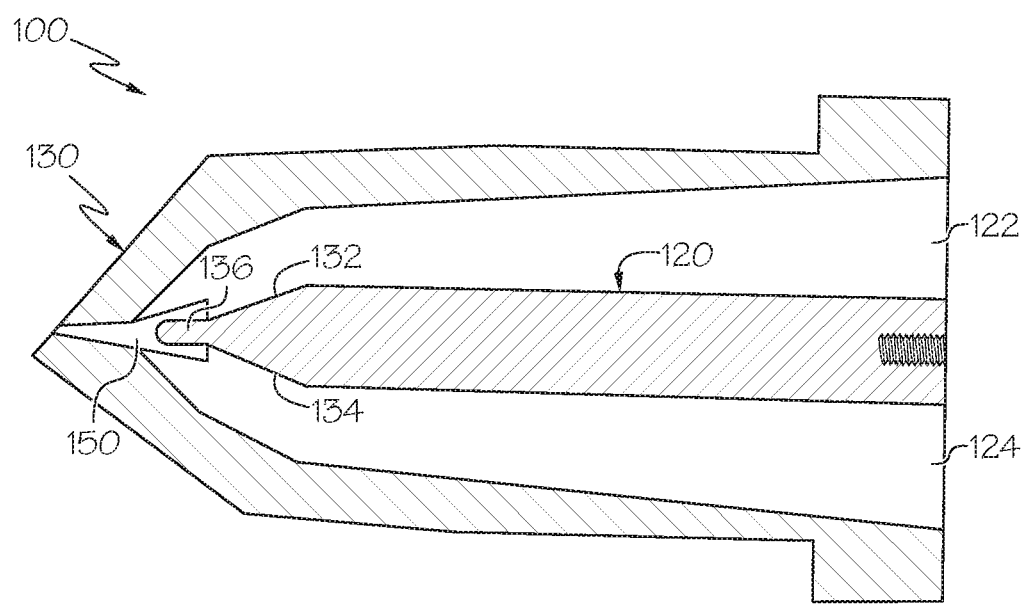
FIG. 7 is a side cross-sectional view of the coextrusion nozzle of FIG. 6.

FIG. 3 illustrates a cross-sectional view of a second example of an apex profile 200 that can be substituted with the apexes of FIG. 1A and FIG. 1B. The apex 200 is formed by strip lamination, or by winding a continuous coextruded strip 210 of two discrete layers of green rubber onto a tire building drum 18 or a shaped green carcass. The continuous coextruded dual strip 210 is shown in FIG. 2A, and is a dual layer of a first rubber compound 212 and second rubber compound 214, wherein each rubber compound has different properties. Each strip 210 has an axis X-X.

The first layer 212 is formed from a first rubber compound which is typically used to form an apex. The second compound is preferably a rubber compound preferably having high stiffness properties. The first and second rubber compounds of the strip are formed in discrete layers 212, 214, and thus are not mixed together.

The first layer thickness of the first compound is preferably in the range of about 0.3 mm to about 2 mm, and more preferably in the range of about 0.6 to about 1.2 mm. The second layer thickness of the second compound preferably has a thickness in the range of about 0.01 mm to about 0.2 mm, more preferably about 0.01 mm to about 0.1 mm. The overall width of the strip 230 is in the range of about 10 mm to about 50 mm, more preferably 20-40 mm. The term "about" as used herein means a variation of +/−10%.

Figure 2B:
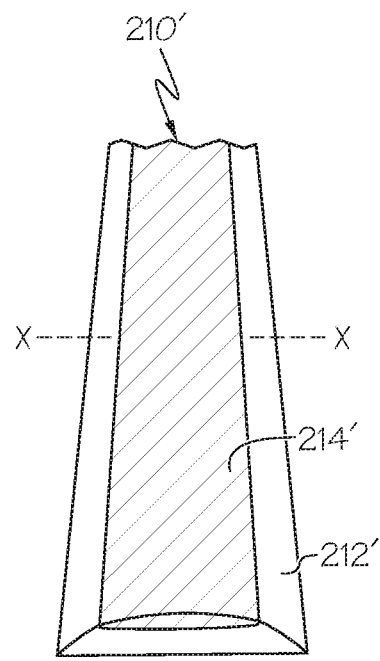
FIG. 2B is a perspective view of a coextruded strip of 95% of a first compound and 5% of a second compound.

The coextruded strip 210 shown in FIG. 2A is a dual layer strip of a first layer 212 having a ratio of 90% of the first compound. The dual layer strip 210 has a second layer 214 having a ratio of 10% of the second compound. FIG. 2B illustrates a dual layer strip 210' having a first layer 212' formed of the first compound and a second layer 214' formed of the second compound, wherein the dual layer strip has a ratio of 95% of the first compound to 5% of the second compound. The apparatus used to form the continuous coextruded strip is described in the paragraphs below and is shown in FIGS. 4-7. The apparatus can form the coextruded strip while instantaneously varying the ratio of the first compound to the second compound.

As shown in FIG. 3, the annular strip windings 220, 222, 224 are overlapped or stacked in the radial direction. In the strip windings nearest the bead, preferably the first three step windings 220, 222, 224, have a strip composition preferably in the range of 90-100% of the first compound, while the second compound is in the range of 0-10% by volume of the strip. The midportion of the apex which correspond to strip windings 226-236, the strip composition is preferably 50% first compound, and 50% of a second compound. The radially outer portion of the apex that is radially outward of the midportion corresponds to strip windings 238-244, the strip composition is preferably 80% first compound, and 20% of a second compound. The radially outermost portion of the apex that corresponds to strip windings 246-258, the strip is preferably 100% second compound.

The stiffness may be characterized by the dynamic modulus G', which are sometimes referred to as the "shear storage modulus" or "dynamic modulus," reference may be made to Science and Technology of Rubber, second edition, 1994, Academic Press, San Diego, Calif., edited by James E. Mark et al, pages 249-254. The shear storage modulus (G') values are indicative of rubber compound stiffness which can relate to tire performance. The tan delta value at 100° C. is considered as being indicative of hysteresis, or heat loss.

In a first embodiment, the second rubber compound comprises a stiff rubber composition having a shear storage modulus G' measured at 1% strain and 100° C. according to ASTM D5289 ranging from 18 to 32 MPa, and the first rubber compound comprises a rubber composition having a shear storage modulus G' measured at 1% strain and 100° C. according to ASTM D5289 ranging from 1.2 to 10 MPa. In a more preferred embodiment, the second rubber compound comprises a rubber composition having a shear storage modulus G' measured at 1% strain and 100° C. according to ASTM D5289 ranging from 23 to 31 MPa, and the first rubber compound comprises a rubber composition having a shear storage modulus G' measured at 1% strain and 100° C. according to ASTM D5289 ranging from 1.4 to 2.3 MPa.

Composite Apex Forming Apparatus

FIGS. 4-12 illustrate a composite apex forming apparatus 102. FIGS. 4-7 illustrate a coextruded strip forming apparatus 10, which includes a first extruder 30 for receiving a first rubber composition, and a second extruder 60 for receiving a second rubber composition. The first compound is extruded by the first extruder 30 and then pumped by the first gear pump 42 into a nozzle 100, while at the same time the second compound is extruded by the second extruder 60 and then pumped by the second gear pump 44 into the coextrusion nozzle 100. The coextrusion nozzle 100 has a removable insert 120 that functions to divide the nozzle into a first and second flow passageway 122, 124. The removable insert 120 is preferably rectangular in cross-sectional shape. The removable insert 120 has a distal end 130 with tapered ends 132, 134 forming a nose 136. The nose 136 is positioned adjacent the nozzle die exit 140 and spaced a few millimeters from the die exit 140. The region between the nose 136 and the die exit 140 is a low volume coextrusion zone 150 that is high pressure. In the low volume coextrusion zone 150, the first compound flowstream 122 merges with the second compound flowstream 124 forming two discrete layers 212, 214 joined together at an interface 215.

The coextrusion nozzle 100 is preferably mounted upon a rotatable head 70, which allows the rotatable head 70 and nozzle to rotate about the z axis. The nozzle has a small tapered tip. As best shown in FIGS. 2 and 3, this rotation is important in forming the apex, as the rotatable head and nozzle allows the rubber to penetrate the tight intersection of the bead and platen interface, so that the rubber forming the apex penetrates the bead for good adhesion. Located adjacent the output of the nozzle 100 is a pneumatically driven stitching wheel 75, which facilitates application of the strip to the platen. The stitching pressure is pneumatically controlled. The nozzle 100 is also used to shape the strip of the rubber into a desired geometry.

The volume ratio of the first compound to the second compound may be changed by varying the ratio of the speed of the first gear pump of the first compound to the speed of the second gear pump of the second compound. The dual coextruded strip forming apparatus 10 can adjust the speed ratios on the fly, and due to the small residence time of the coextrusion nozzle, the apparatus has a fast response to a change in the compound ratios. This is due to the low residence time. The composite apex forming apparatus 102 further includes an annular flat platen 110 that is rotatably mounted and is preferably oriented in the vertical direction (Z). The annular flat platen 110 preferably has an outer surface having a nonstick coating. The annular flat platen 110 is mounted on a backing plate so that it is retractable in the axial (X) direction, in a direction away from a bead chuck assembly 115.

The bead chuck assembly 115 is located at the radially inner portion of the annular flat platen 110 for receiving and securing a bead therein. The bead chuck is formed of three or more members 118 that are arranged in a circle for radial expansion in order to secure the bead. While the bead chuck holds the bead in place, the annular flat platen provides a rotatable and removable support for applying a continuous co-extruded or dual strip of rubber that is formed into an apex or a combination bead and apex subassembly. In order to remove the bead and apex subassembly, the annular flat platen 110 is retracted in the axial (X) direction away from the bead chuck to facilitate removal of the formed apex A or apex and bead assembly.

Figure 8:
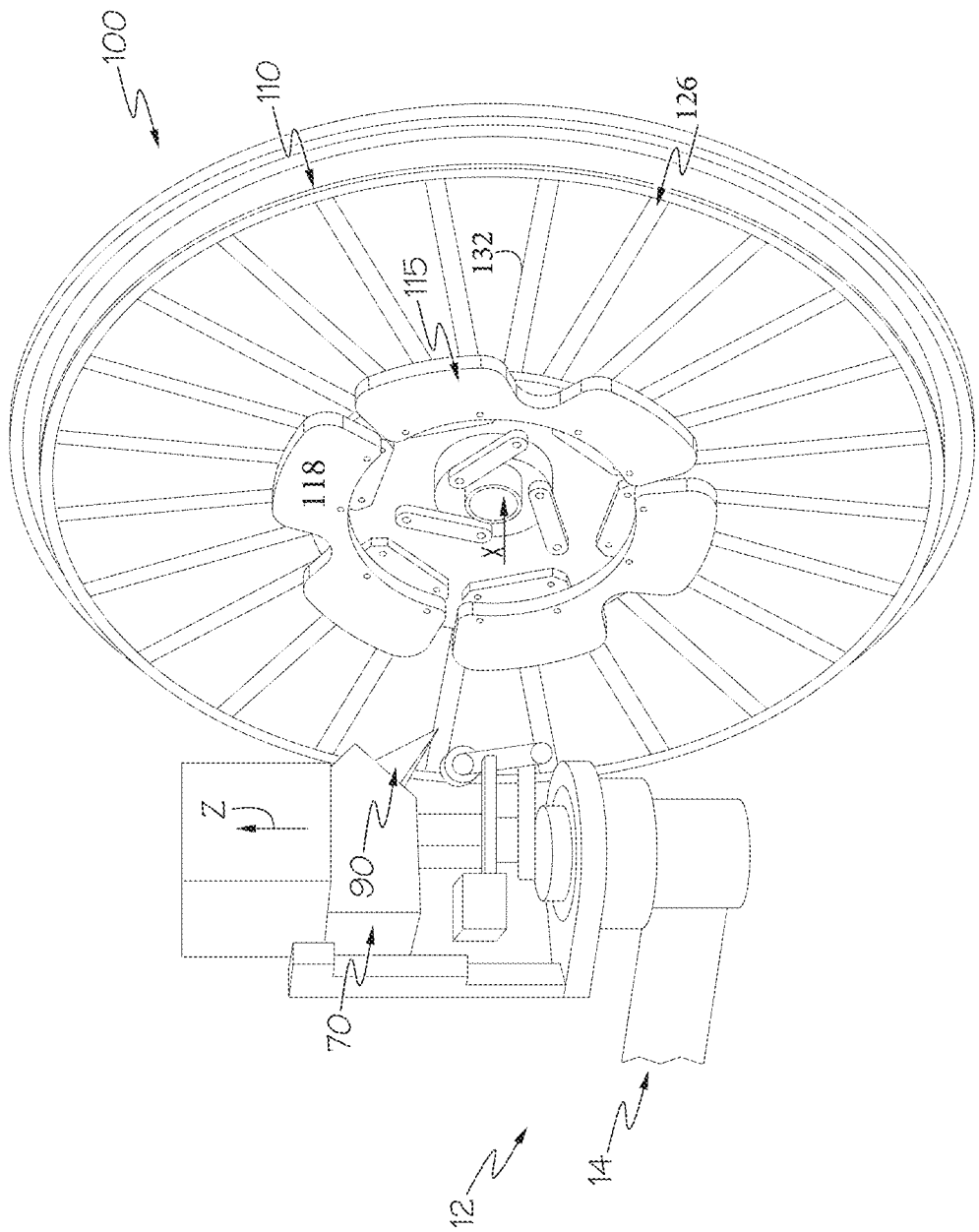
FIG. 8 illustrates a perspective view of a composite apex forming apparatus which includes a rotatable platen and an extruder apparatus for forming a co-extruded strip having a pivotable head and nozzle assembly.
Figure 9:
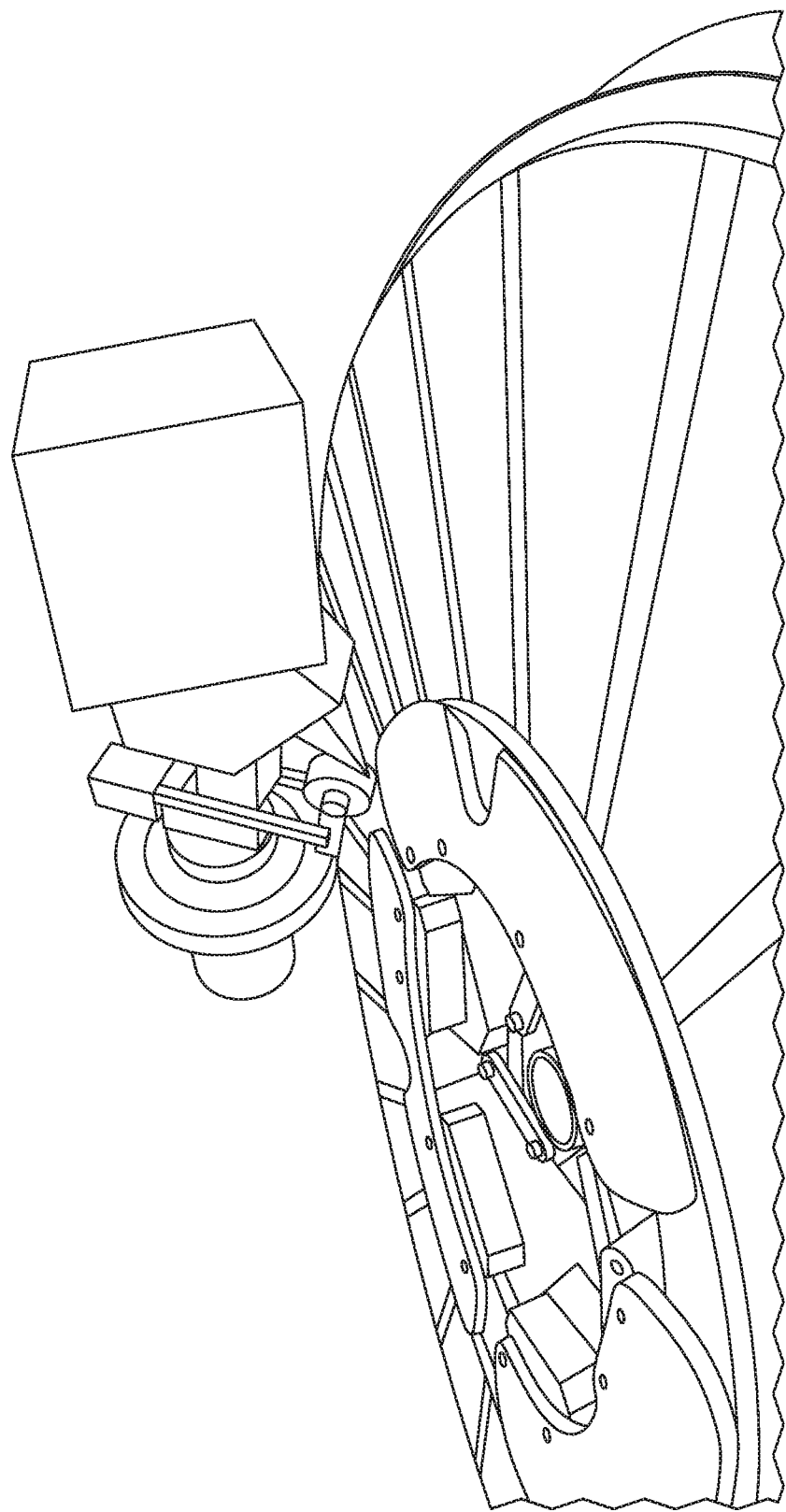
FIG. 9 illustrates a close-up perspective view of a bead mounted in the chuck of the composite apex forming apparatus.
Figure 10:
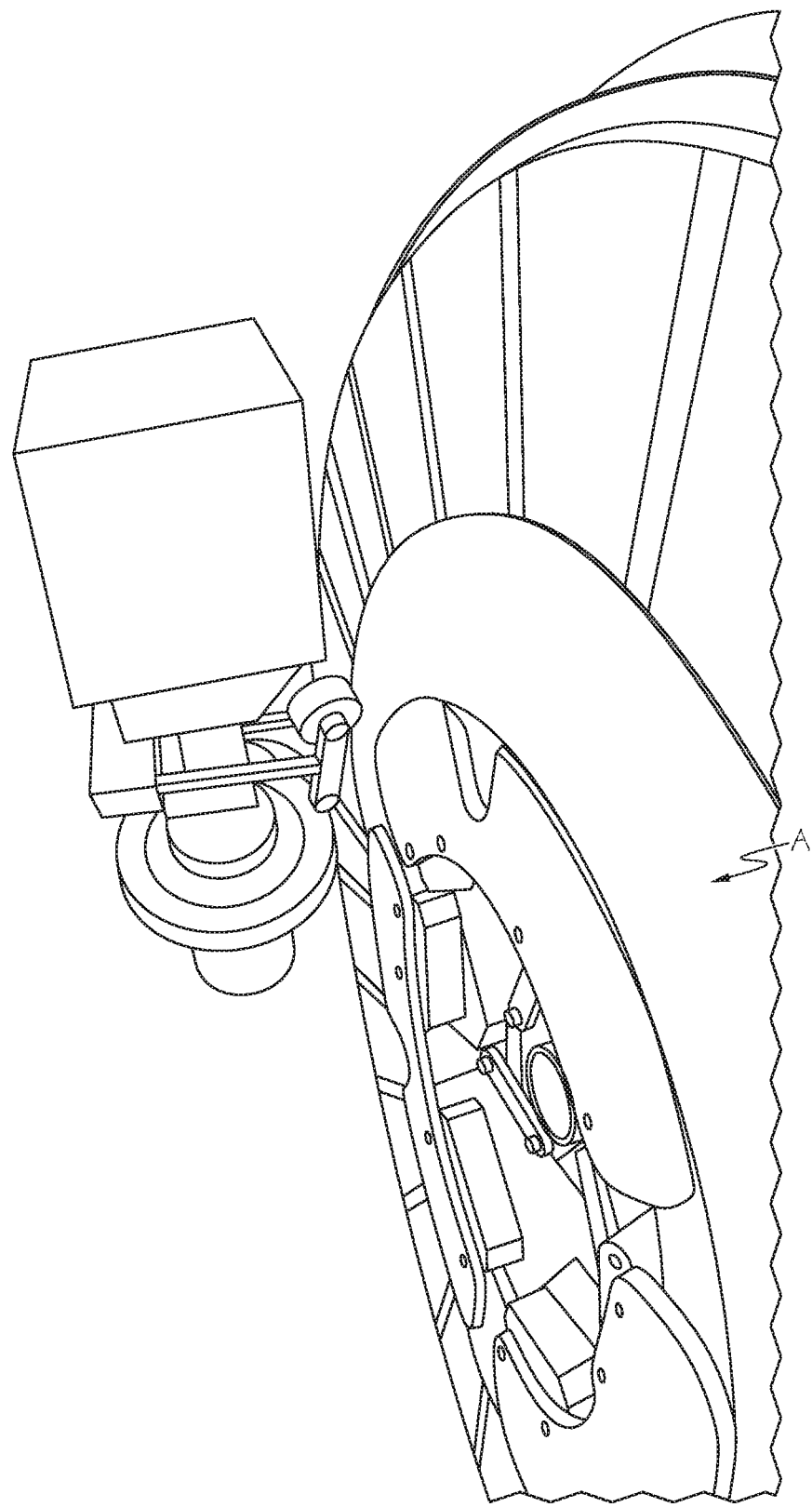
FIG. 10 illustrates a composite apex being formed on the bead and the rotatable platen by the nozzle of the extruder apparatus.
Figure 11:
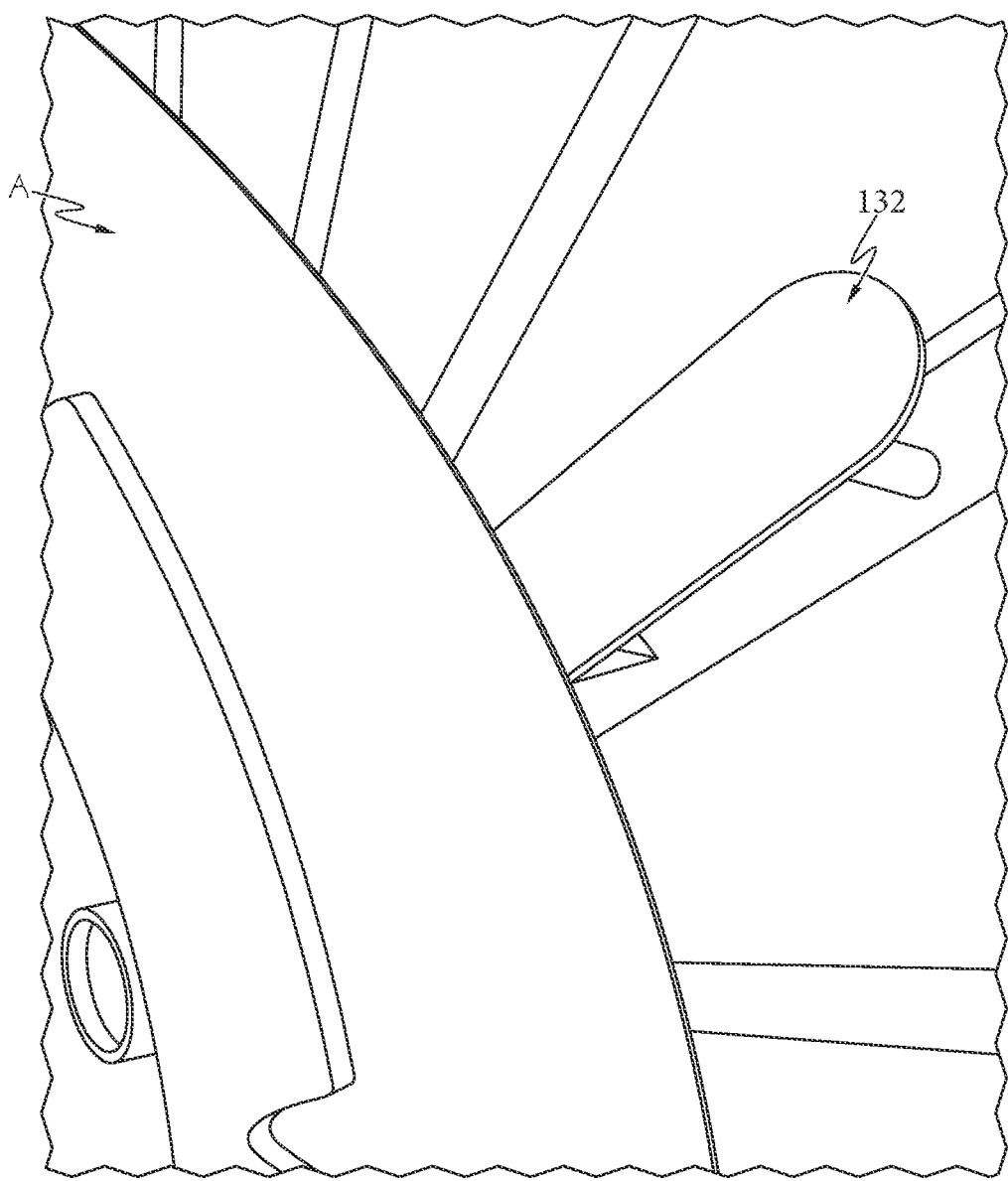
FIG. 11 illustrates the extension of a radial bar from the outer surface of the platen to facilitate removal of the apex from the platen.
Figure 12:
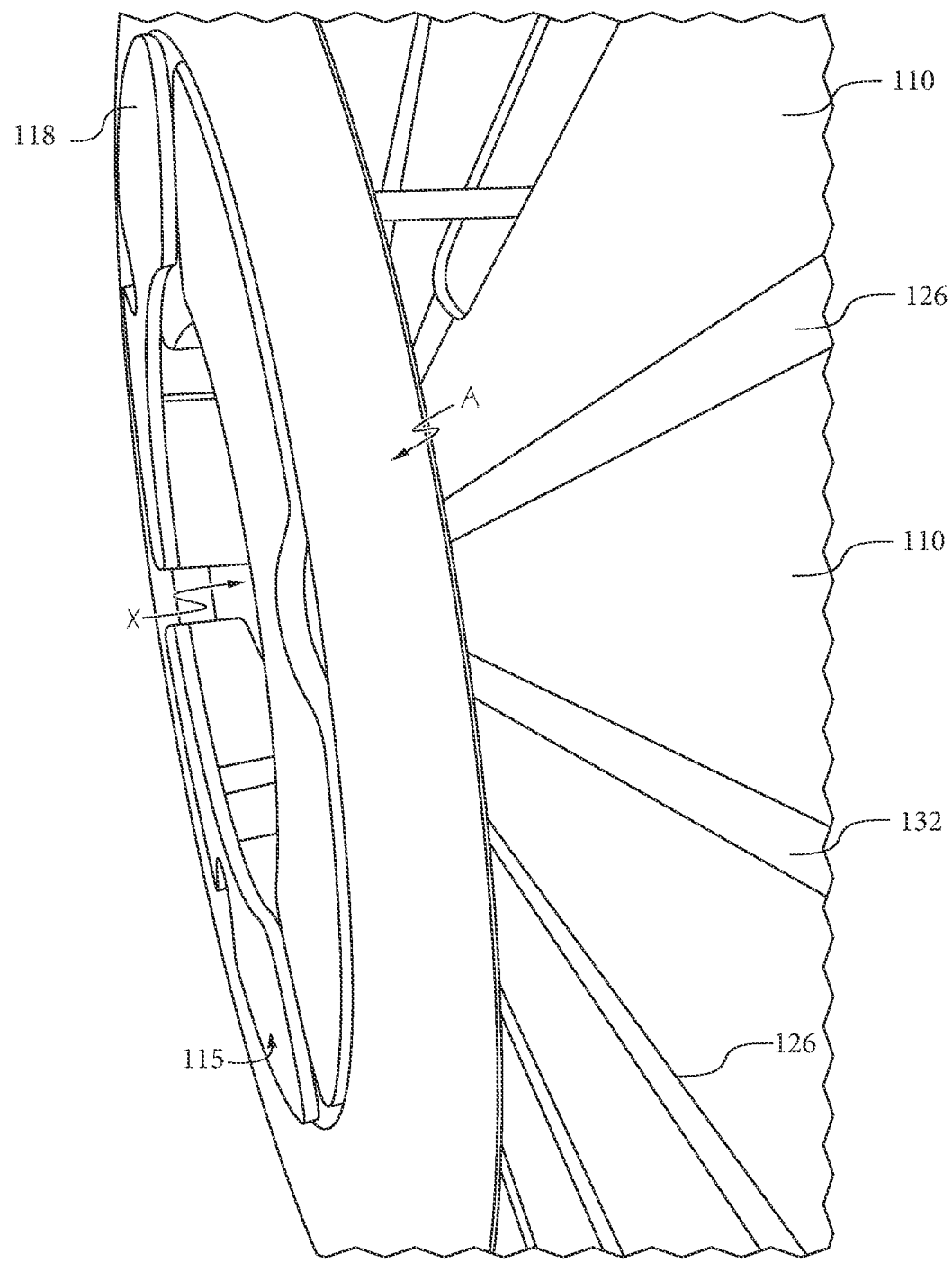
FIG. 12 illustrates the axial retraction of the rotatable platen from the bead chuck to facilitate removal of the apex from the platen.

The outer receiving surface of the annular platen 110 further comprises one or more bars 126 that are preferably oriented in the radial direction. The one or more bars 126 are preferably coated with the nonstick coating. The annular flat platen 110 further includes at least one or more standoff bars 132 that are preferably oriented in the radial direction. When the annular flat platen is mounted in a first position for applying the apex, the one or more standoff bars 130 are flush with the outer surface of the annular platen such as shown in FIG. 8. After the apex has been applied to the bead and the annular flat platen and it is time for removal of the apex and bead subassembly, the annular flat platen 110 is retracted in an axial direction away from the bead support 115. When the annular flat platen retracts, the one or more standoff bars 132 remain in position as shown in FIG. 11. The movement of the platen away from the standoff bars 132 breaks the surface adhesion of the rubber apex, thus facilitating the removal of the apex from the outer surface of the annular flat platen 110.

Variations in the present inventions are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A method for forming a composite apex, the method comprising the steps of:

forming a coextruded strip of a first compound and a second compound, wherein the second compound is a compound different than the first compound, wherein the composite apex is formed by winding the coextruded strip onto a rotatable platen, wherein the rotatable platen has a radially expandable bead chuck located on a radially inner portion of the rotatable platen, wherein the rotatable platen has an outer surface having a nonstick coating, and wherein the outer surface further includes one or more standoff bars, wherein the one or more standoff bars are flush with the outer surface of the rotatable platen in a first position and nonflush when the rotatable platen is axially retracted in a second position.

2. The method of forming a composite apex of claim 1 wherein the rotatable platen further includes one or more bars.

3. The method of forming a composite apex of claim 2 wherein the one or more bars are oriented in the radial direction.

4. The method of forming a composite apex of claim 2 wherein at least one of the one or more bars is extensible so that it protrudes from the outer surface of the rotatable platen.

5. The method of forming a composite apex of claim 1 wherein the rotatable platen is oriented in the vertical (Z) direction.

6. The method of forming a composite apex of claim 1 wherein the rotatable platen is axially retractable from the bead chuck in an X direction.

7. The method of forming a composite apex of claim 1 wherein the strip is applied using a rotatable head which is rotatable about a Z direction.

8. The method of forming a composite apex of claim 1 wherein the co-extruded strip is applied using a nozzle mounted on a rotatable head which is rotatable about a Z direction.

9. The method of forming a composite apex of claim 8 wherein a rotatable stitcher roll is positioned under the nozzle.

10. The method of forming a composite apex of claim 1 wherein a volume ratio of the first compound to the second compound is varied.

11. The method of forming a composite apex of claim 1 wherein the coextruded strip is formed by:
  extruding a first compound through a first extruder and a first gear pump and into a first passageway of a coextrusion nozzle;
  extruding a second compound through a second extruder and a second gear pump and into a second passageway of the coextrusion nozzle; and
  wherein the first and second passageways are joined together immediately upstream of a die outlet of the coextrusion nozzle.

12. The method of forming a composite apex of claim 11 wherein the coextrusion nozzle has an insert which divides the nozzle into a separate first and second passageway.

13. The method of claim 1 wherein a ratio of a volume of the first compound to a volume of the second compound is varied by changing a ratio of a speed of the first gear pump to the second gear pump.

* * * * *